Patented Oct. 6, 1953

2,654,718

UNITED STATES PATENT OFFICE 2,654,718

STABILIZER COMPOSITION AND STABILIZED VINYL RESIN

Oliver J. Grummitt and Robert E. Blank, Cleveland, and Dean Marsh, Cleveland Heights, Ohio, assignors to The Sherwin-Williams Company, Cleveland, Ohio, a corporation of Ohio No Drawing. Application November 27, 1950, Serial No. 197,844

17 Claims. (Cl. 260—23)

This invention relates as indicated to new compositions of matter which are particularly useful as stabilizers for halogen-containing polymers, and especially halogen-containing polymeric materials containing or consisting of a vinyl halide.

Much effort has been directed in recent years to the problem of stabilizing halogen-containing polymeric materials to the effects of heat and light. In the production of various resinous materials and articles made therefrom, it is frequently necessary to employ temperatures which tend to decompose the resins. Exposure to light for the life of the article also causes decomposition. Although this decomposition does not, in most cases, destroy the properties of the resins which render them structurally useful, it is accompanied by a discoloration, or the development of color in the resin which renders the product undesirable for many purposes. On heating a clear, colorless vinyl resin, such as vinyl chloride-vinyl acetate, the resin will develop a faint yellow color, and then on continued heating the yellowed color becomes progressively darker until finally the material is black and charring occurs. For many purposes, it is undesirable that even the faintest yellowing appears in these resins.

It is a principal object of this invention, therefore, to provide a new composition of matter suitable for use as a heat and light stabilizer in halogen-containing polymeric materials, and particularly polymeric or resinous materials characterized by the presence therein of a vinyl halide, such as vinyl chloride.

Another object of this invention is to provide a halogen-containing polymeric material which has improved stability to the destructive forces of heat and light.

Another object of this invention is to provide a method of stabilizing a halogen-containing polymeric material. Still other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Broadly stated, this invention comprises as a new composition of matter, suitable for use in stabilizing halogen-containing polymeric materials to the destructive forces of heat and light, a homogeneous mixture comprising in combination disodium acid phosphate dodecahydrate in a bodied or thermally polymerized tri-glyceride oil, preferably of the vegetable oil type. This invention also comprises a halogen-containing polymeric material containing as a stabilizer therefor from about 0.1 to 10 parts per 100 parts of resin of a mixture of from about 20% to 70% of disodium hydrogen phosphate dodecahydrate homogeneously dispersed in a viscous oil of the tri-glyceride type. In certain instances a still more satisfactory composition can be produced by the inclusion of a minor amount of an inhibitor, hereinafter more particularly described.

More specifically, the stabilizing composition of this invention comprises a mixture of a viscous oil of the glyceride type and from approximately 20% to 70% by weight of disodium hydrogen phosphate dodecahydrate. A specific example of the stabilizing composition of this invention is a mixture of bodied de-hydrated castor oil and 36% by weight of disodium phosphate dodecahydrate. This product is a fluid white cream, although many of the products are wax-like materials having white to yellow color.

Many salts, especially those containing alkali and alkaline earth metals with inorganic or organic acid radicals, are known to be stabilizers. In general, however, the compatability with polymer-plasticizer mixtures of wholly inorganic mixtures of wholly inorganic salts is so poor that it is difficult or even impossible to obtain homogeneous or transparent films. Sodium carbonate is an example of such a salt.

The unique aspect of this invention lies in the discovery that disodium hydrogen phosphate dodecahydrate can be homogeneously dispersed in a bodied or thermally polymerized fatty oil. In this form, this particular salt is readily blended with the other components of a resin formulation to produce a clear, transparent resin highly resistant to the action of heat and light.

In producing the compositions of this invention, there are several methods which may be employed. The first of these is the treatment of the bodied tri-glyceride oil, with phosphoric acid followed by partial neutralization with an alkaline reacting material, such as aqueous sodium hydroxide. A second method involves the mere addition of disodium hydrogen phosphate dodecahydrate to the bodied oil. A third method of preparing the compositions of this invention involves the simultaneous addition of phosphoric acid and aqueous sodium hydroxide to the bodied oil.

In producing compositions involving going through a chemical reaction, it should be borne in mind that reaction of any of the reagents with the tri-glyceride is not desired, i. e., the compositions of this invention are substantially homogeneous mixtures of an inorganic salt, disodium hydrogen phosphate dodecahydrate, and a tri-glyceride oil. Thus, the use of reagents of a kind or in a concentration sufficient to cause substantial splitting of the fat and the formation of organic-phosphorus derivatives is to be avoided. If the salt is to be formed in situ in accordance with one of the methods herein mentioned, $P_2O_5$, $POCl_3$, etc., should be avoided since they are generally of sufficient strength to cause the production of organic-phosphorus compounds. Phosphoric acid is a relatively weak acid, and while it will promote dehydration of hydroxy-containing tri-glycerides, as, for example, castor oil, it will not esterify such groups to any appreciable extent under the conditions herein employed. Upon neutralization with aqueous hydroxide, this acid yields the disodium acid phosphate dodecahydrate in situ. The evidence in support of this conclusion is that a composition having identical properties is produced by merely adding the proper amount of the previously prepared salt to the oil or dehydrated oil as the case may be.

This invention may be illustrated by the following specific examples which are not, however, to be construed as limitations on the scope of this invention, but as merely illustrative of the steps or procedures by which these useful compositions are produced.

*Example 1*

To illustrate the first method mentioned above, 170 gms. of castor oil (0.161 mol of glyceryl tri-ricinoleate) and 200 gms. of benzene were placed in a 1 liter, 3 necked flask fitted with a reflux condenser, distilling receiver, thermometer and mercury seal stirrer. 56 gms. (1.45 equivalents) of 85% phosphoric acid were added and the solution was heated at reflux (88–95° C.) for 30 hours. 17½ ml. (0.9 mol) of water were collected. The residue had an acid number of 177 (calculated 168). A gel formed during the addition of a solution of 52 gms. (0.97 equivalent) of sodium carbonate in 200 ml. of water. Codistillation with benzene was used to remove the water. After most of the water had been removed and the gel broken, the mixture was stripped at 100–110° C. at 30 mm. Hg to give 170 gms. of product (calculated 189 gms.), on a water-free basis. Percent yield in this case was 90%, and the product had an acid number of 17 using phenolphthalein indicator. Table I gives the stabilizing properties of this mixture, designated as Stabilizer I.

25 gms. of the above product was extracted with benzene to give a benzene-soluble oil and a benzene-insoluble white slurry. The white slurry was ignited at 300° C., extracted with water and the extract filtered. Evaporation of the filtrate gave 6.1 gms. of disodium hydrogen phosphate.

Distillation of the benzene from the oil layer gave 16.3 gms. of a material having an acid number of 3 and a percent hydroxyl of zero. This information led to the conclusion that the product was a physical mixture of disodium hydrogen phosphate in dehydrated castor oil.

*Example 2*

Instead of dehydrating castor oil by the action of phosphoric acid, followed by neutralization, an equivalent product can be made from castor oil (dehydrated) and disodium hydrogen phosphate dodecahydrate. 36 parts of disodium hydrogen phosphate dodecahydrate is melted at 50–70° C. 64 parts of 120 second (Gardner-Holdt viscosity scale) dehydrated castor oil is then added slowly with stirring. Stirring is continued until the mixture cools. Table I gives the stabilizing properties of the mixture, designated as Stabilizer II.

The composition of the hydrate is important to the stability of the mixture against separation on standing. If the dodecahydrate has been exposed to air for some time, it will contain less than $12H_2O$ per molecule of salt. This can be determined by drying to constant weight to 110° C. The deficiency of water should be calculated and this amount added to the melted salt. In the same way, anhydrous or any partially hydrated disodium acid phosphate may be used, if the proper amount of water to form the dodecahydrate is added.

*Example 3*

An equivalent product can also be made from dehydrated castor oil in which phosphoric acid and sodium hydroxide are allowed to react. 400 gms. of 120 second dehydrated castor oil and a solution of 58.2 gms. (1.45 equivalents) of sodium hydroxide and 120.6 ml. of water was stirred at 0–5° C. Dropwise addition of 85.2 gms. (2.18 equivalents) of 85% phosphoric acid caused the mass to gel and the stirrer to break. Reversing the order of acid-base addition did not prevent gelling, but when the acid and base were added simultaneously and at equal rates to the oil at 0–5° C. as above, a stable mixture was formed in 94% yield, which contains 36% by weight of disodium hydrogen phosphate dodecahydrate. From the foregoing examples, it will be observed that the water in the compositions is in chemical association with the disodium hydrogen phosphate salt in the ratio of 12 mols of water to each mol of the disodium hydrogen phosphate salt.

The glyceride oils useful in this invention are those which have been thermally polymerized, or heat bodied, to a viscosity substantially greater than the un-polymerized oil, i. e., the final viscosity should be within the range of from 40 to 1100 seconds (Gardner-Holdt), desirably from about 60–250 seconds. Accordingly, un-polymerizable, as well as unpolymerized oils, or glycerides are without the scope of this invention, and only those oils or glycerides containing unsaturated acid radicals to an extent and degree of unsaturation to permit heat polymerization to a viscosity as mentioned are useful herein. Generally, only the triglyceryl esters, e. g., fatty oils, are so useful. Such oils include the naturally occurring vegetable oils, e. g., cottonseed oil, soya bean oil, sunflower seed oil, chia oil, oiticica, tung oil, perilla oil, linseed oil; marine oils, e. g., menhaden oil, sardine oil, cod liver oil, etc.; and pure or mixed synthetic triglycerides synthesized from the acids found in such oils, or derived from the foregoing glycerides, e. g., dehydrated castor oil. The term "bodied glyceride oil" as used herein is intended to define those unsaturated oils, natural or synthetic, which may be heat polymerized to provide a "body" or viscosity within the range of from about 40 to about 1100 seconds, Gardner-Holdt. Preferred oils are of the drying or semi-drying type. Bodied oils which are air blown or oxidized do not give as satisfactory results as where oxygen is omitted. The peculiar property of bodied tri-glyceride oils in providing stable mixtures is shown by the fact that none of the following liquids gave satisfactory, or even usable mixtures when made up with sodium hydrogen phosphate dodecahydrate in the usual way, that is, in accordance with Example 2 above:

Castor oil monoglyceride.
Dioctyl phthalate.
Tricresyl phosphate.
Paraffine hydrocarbon mixtures having viscosities (Gardner-Holdt) of 530, 300 and 60 seconds.
Ethylene glycol.

and several commercially available plasticizers. Various other phosphates have been tried with one of the most satisfactory dispersing media, namely, dehydrated castor oil (120 second Gardner-Holdt viscosity) but stable suspensions are produced only in the case of disodium hydrogen phosphate dodecahydrate. The following salts were tried under the conditions given in Example 2:

1. Monobasic sodium phosphate monohydrate.
2. Monobasic sodium phosphate dihydrate.
3. Dibasic sodium phosphate anhydrous.
4. Dibasic sodium phosphate monohydrate.
5. Dibasic sodium phosphate heptahydrate.
6. Dibasic sodium phosphate dodecahydrate.
7. Tribasic sodium phosphate anhydrous.
8. Tribasic sodium phosphate dodecahydrate.
9. Sodium meta phosphate anhydrous.
10. Sodium pyro phosphate anhydrous.
11. Sodium pyro phosphate dodecahydrate.

In all cases except 6, unstable suspensions were produced.

The potassium and lithium salts are unsuitable for use in this invention because neither one of these metals produces a dibasic hydrate which has a sufficiently low melting point to permit blending with the oil.

A complete explanation for the unusual fluidity and stability of the preferred mixture of about 36% by weight of disodium hydrogen phosphate dodecahydrate in a bodied glyceride oil, cannot be given. The low melting point of 35° C. of the salt is a factor in obtaining the suspension because higher melting hydrates, for example, disodium hydrogen phosphate heptahydrate, do not work. A viscous medium is necessary, because unbodied oils, for example, unbodied dehydrated castor oil having a viscosity of G to H on the Gardner-Holdt scale, do not work satisfactorily. In general, viscostiy limits range from 40–1100 seconds, Gardner-Holdt. Particular examples made from bodied linseed oils having viscosities of 65 seconds, 250 seconds and 950 seconds respectively in accordance with the procedure of Example 2 above have been made. In general, the stability of these compositions was satisfactory, but they were not as desirable as the preferred dehydrated castor oil mixture for the reason that the linseed oil compositions of this invention have a characteristic odor which may be undesirable for certain uses.

The products of this invention exhibit peculiar behavior in many respects. Generally they have the consistency of a shaving-cream and may be diluted with acetone up to a point below which no separation occurs, to produce a very fluid product which readily passes through a filter paper without leaving a residue. Preferred examples of these products appear to have indefinite storage stability.

The concentration of the salt is somewhat critical at the lower limit of about 20% and less critical near the upper limit of about 70%. In general, where no agglomeration and crystallization inhibitor has been included, at well below 20% by weight of the salt, there is evidence of slight crystallization after 10 days which gradually increases on prolonged standing up to 3 months where considerable crystallization is noted. In the range of 30% to 40% greater stability is observed, uninhibited examples showing homogeneity even after three months storage at 25° C. At the higher concentrations, i. e., 50% to 70%, the product tends to become more granular with some tendency to agglomerate. There is, however, no phase separation observed. It is to be understood that these conditions do not occur under all circumstances, i. e., the nature of the vehicle, the temperature, the presence or absence of inhibitors, the tests upon which the foregoing is based being 25° C. stability tests. At higher temperatures, e. g., 37° C., the effects observed at 25° C. are either absent or less pronounced. Accordingly, it is not mandatory to include a crystallization and/or agglomeration inhibitor in these compositions, although practical reasons indicate that the use of such a material is to be desired, particularly at the higher salt concentrations.

Amounts less than 36% by weight have been used, but the amount of stabilizer composition which must be added to the polymer-containing composition to attain the same degree of stability will, in general, be greater. As indicated above, the useful range of concentrations is approximately 20 to 70%. At 36%, which corresponds to 3 mols of salt per mol of oil, the ease of preparation and stability of the mixture against separation on standing are most satisfactory.

When the agglomeration or crystallization of the salt into larger particles occurs, a precipitate may settle out. Small amounts of liquid polar organic compounds, of the non-acidic type, i. e., neutral or basic reacting, such as alcohols, e. g., methyl, ethyl, propyl, butyl, cyclohexyl, amyl, octyl, alcohols; methyl ethyl ketone; glycols, such as ethylene glycol, diethylene glycol, trimethylene glycol, glycerol; amines and hydroxylamines, such as, n-butyl amine, n-amyl amine, triethanolamine, diethanolamine, monoethanolamine, and the like appear to retard crystal formation at the lower concentrations and prevent agglomeration at the higher concentrations and thus enhance the storage stability of the mixture. The aliphatic alcohols of from 4 to 10 carbon atoms are highly satisfactory.

A stabilizer composition which is particularly useful for inclusion in heat and light sensitive halogen-containing polymeric materials may be produced as follows: to a product made as described in Example 2 there is added 1% by weight of n-butyl alcohol based on the weight of the salt. The mechanism of the action of the butyl alcohol or other such material is not known, but it is possible that the material acts as a crystallization inhibitor. The presence of the alcohol in the composition greatly reduces the tendency of the mixture to separate on standing. Under one testing procedure three samples of the foregoing were stored at 0°, 25°, and 50° C., and after three months, no evidences of instability have been observed. Table I shows the activity of this substance (III) as a vinyl resin stabilizer.

These crystallization and agglomeration inhibitors, as they may be called by virtue of their effect, are generally employed in amounts ranging from .5% to about 5% by weight of the salt.

Where the concentration of the salt in the glyceride oil is relatively moderate, i. e., from 30% to 40%, it is frequently unnecessary to add such a crystallization inhibitor. However, as the concentration of the disodium hydrogen phosphate dodecahydrate increases above 40% it will be found advantageous in most instances to add an inhibitor of the type mentioned above in gradually increasing amounts to obtain the desired stability. In general, for the preferred compositions of this invention, about 1% by weight of the salt of the inhibitor produces satisfactory results.

It becomes convenient at this point to tabulate the results obtained using various bodied oils of various viscosities in the preferred range when submitted to a stability test at 25° C. for three days. No inhibitors of any kind were used in these examples, and the salt concentration was 36% by weight.

| Bodied Oil | Viscosity, G-H, Seconds | Physical Form of Product | Amount of Crystallization |
|---|---|---|---|
| Dehydrated Castor | 60 | White Cream | None. |
| Sardine | 48 | White Wax | Slight. |
| Safflower | 60 | Yellow Wax | Do. |
| Tung | 180 | do | None. |
| Soya | 60 | do | Do. |
| Blown Soya | 60 | White Cream | Severe—Granular. |

Dehydrated castor oil is a superior vehicle in appearance, odor and stability; however, these tri-glyceride oils show greater stability than found for non-glyceride vehicles.

The following table compares several examples of this invention with strontium naphthenate as stabilizers for a standard vinyl halide-vinyl ester co-polymer, namely vinyl chloride-vinyl acetate containing 95–97% vinyl chloride. The resin is a 50–50 mixture of this co-polymer and dioctyl phthalate as a plasticizer.

TABLE I

| Stabilizer | Strontium Naphthenate | I | II | III |
|---|---|---|---|---|
| 1. Amount Used (parts per 100 parts of resin). | 3.0 | 1.0 | 1.0 | 1.0. |
| 2. Color of Original Sheet. | Very Slight | None | None | None. |
| 3. Transparency of Original Sheet. | Clear | Clear | Clear | Clear. |
| 4. Blooming or Exuding of Stabilizer to Surface of Sheet. | None | None | None | None. |
| 5. Water Absorption (Percent Gain in weight after immersion for 7 days at 85° C.). | 3.4 | 5.6 | 5.3 | 5.2. |
| 6. Heat Stability (after 1 hr. in oven @ 150° C.)[1]. | 3 | 5 | 5 | 5. |
| 7. Heat Stability (after 3 hrs. in oven @ 150° C.)[1]. | 3 | 4 | 4 | 4. |
| 8. Light Stability (after 21 days in Eveready Twin Carbon arc Ultraviolet Light Tester)[1]. | 3 | 5 | 5 | 4. |

[1] Stability decreases in the order 5, 4, 3, 2, 1.

With respect to the halogen-containing polymeric material, it is generally believed that the action of heat and light on such materials causes a release of chlorine or hydrogen chloride which is responsible for the discoloration. The phenomena appears to be general with resins of the polymeric type which contain halogen such as chlorine, fluorine or bromine. By far the most important class of resinous materials are those which contain a halogen-containing vinyl compound or halogen-containing vinyl derivatives such as vinyl chloride, vinyl bromide, vinyl fluoride, vinyl chloroacetate, vinylidene chloride, chlorostyrene or chlorobutadiene, or chloroisoprene as the sole polymer unit or as an ingredient in the polymerization reaction which results in the production of a co-polymer. Halogen-containing polymeric materials also result from the subsequent chlorination or halogenation of a halogen-free polymeric material. In general, the chlorinated rubbers, whether natural or synthetic, are of this class. As indicated above, this invention is particularly useful in connection with those halogen-containing, particularly chlorine-containing, polymeric materials which are characterized by the presence therein of a vinyl halide unit, and especially those which are formed from the co-polymerization of a vinyl halide with a vinyl ester of a low molecular weight aliphatic acid, of from 2 to 5 carbon atoms, e. g., vinyl chloride-vinyl acetate, or with other unsaturated polymerizable compounds, e. g., vinyl alcohol, acrylonitrile, etc.

The stabilizer composition of this invention may be blended with halogen-containing polymeric materials, examples of which are given above, in the concentration of from .1 to 10 parts per 100 parts of resin by ordinary methods of incorporating such additive ingredients. Other ingredients which may be included in the stabilized halogen-containing polymeric resin compositions of this invention include dyes, pigments, fillers, plasticizers and the like, all of which are well known. While it may appear from the foregoing that this invention is useful only in connection with those halogen-containing polymeric resins which are colorless, it is frequently desirable in the case of pigmented resinous materials to maintain color stability in the color imparted by the pigmentary material or dye as the case may be. If the base polymer or copolymer were to discolor under the influences of heat and light, the added color from this source could undesirably alter the color sought to be achieved by the pigment or dye.

It should be pointed out that the term "resin" as used herein is intended to cover the plasticized material, together with any other ingredients which may be employed in the final product, and the terms "polymer" or "copolymer" to cover the unplasticized material. The term "polymeric materials" is intended to include both "resins" and "polymers" or "co-polymers."

Other modes of applying the principle of this invention may be employed instead of those specifically set forth above, changes being made as regards the details herein disclosed, provided the elements set forth in any of the following claims, or the equivalent of such be employed.

We, therefore, particularly point out and distinctly claim as our invention:

1. A composition of matter comprising a stable homogeneous mixture of from about 20% to 70% by weight of the entire mixture of disodium hydrogen phosphate dodecahydrate in a thermally polymerized glyceride oil having a viscosity of from about 40 to 1100 seconds (Gardner-Holdt) and from about 0.5% to about 5% based on the weight of the salt of a non-acidic polar organic liquid selected from the group consisting of aliphatic alcohols, aliphatic amines, and aliphatic hydroxyl amines, the water present in said composition being chemically associated with the disodium hydrogen phosphate salt in the ratio of 12 mols of water to 1 mol of the disodium hydrogen phosphate salt.

2. A composition of matter in accordance with claim 1 in which the polar organic liquid is an aliphatic alcohol of from 4 to 8 carbon atoms.

3. A composition of matter in accordance with claim 1 in which the polar organic liquid is n-butyl alcohol.

4. A composition of matter in accordance with claim 1 in which the glyceride oil is a vegetable oil.

5. A composition of matter in accordance with claim 1 in which the glyceride oil is a drying oil.

6. A composition of matter in accordance with claim 1 in which the glyceride oil is a semi-drying oil.

7. A composition of matter in accordance with claim 1 in which the glyceride oil is a vegetable drying oil.

8. A composition of matter in accordance with claim 1 in which the glyceride oil is dehydrated castor oil.

9. A composition of matter in accordance with claim 1 in which the glyceride oil is linseed oil.

10. A composition of mater in accordance with claim 1 in which the glyceride oil is a dehydrated castor oil having a viscosity of about 120 seconds (Gardner-Holdt).

11. A composition of matter consisting essentially of a stable homogeneous mixture of disodium hydrogen phosphate dodecahydrate in dehydrated castor oil of about 120 seconds viscosity (Gardner-Holdt), at a concentration of about 36% by weight, to which composition has been added about 1% based on the weight of the salt, of n-butyl alcohol, the water present in said composition being chemically associated with the disodium hydrogen phosphate salt in the ratio of 12 mols of water to 1 mol of the disodium hydrogen phosphate salt.

12. A composition of matter comprising a stable homogeneous mixture of from about 20% to 70% by weight of disodium hydrogen phosphate dodecahydrate in a bodied glyceride oil having a viscosity of from about 40 to 1100 seconds (Gardner-Holdt), the water present in said homogeneous mixture being chemically associated with the disodium hydrogen phosphate salt in the ratio of 12 mols of water to 1 mol of the disodium hydrogen phosphate salt and said homogeneous mixture being dispersed in a halogen-containing resinous polymeric material in the proportion of from .1 to 10 parts per 100 parts of resin.

13. A composition of matter in accordance with claim 12 in which the halogen-containing polymeric material is a polymer of a vinyl halide.

14. A composition of matter in accordance with claim 12 in which the halogen-containing resinous polymeric material is a polymer of vinyl chloride.

15. A composition of matter in accordance with claim 12 in which the halogen-containing resinous polymeric material is a co-polymer of a vinyl halide and a vinyl ester of a low molecular weight aliphatic acid of from 2 to 5 carbon atoms.

16. A composition of matter in accordance with claim 12 in which the halogen-containing resinous polymeric material is a vinyl chloride-vinyl acetate co-polymer.

17. A composition of matter comprising a vinyl chloride-vinyl acetate co-polymer containing from .1 to 10 parts per 100 parts of resin of a stable homogeneous mixture containing about 36% by weight of disodium hydrogen phosphate dodecahydrate in dehydrated castor oil having a viscosity of about 120 seconds (Gardner-Holdt), and about 1% based on the weight of the salt of n-butyl alcohol, the water present in said homogeneous mixture being chemically associated with the disodium hydrogen phosphate salt in the ratio of 12 mols of water to 1 mol of the disodium hydrogen phosphate salt.

OLIVER J. GRUMMITT.
ROBERT E. BLANK.
DEAN MARSH.

References Cited in the file of this patent

UNITED STATES PATENTS

| Number | Name | Date |
|---|---|---|
| 2,115,668 | James | Apr. 26, 1938 |
| 2,218,645 | Japs | Oct. 22, 1940 |
| 2,246,915 | Dangelmajer | June 24, 1941 |
| 2,418,451 | Auer | Apr. 8, 1947 |
| 2,507,142 | Chaban | May 9, 1950 |
| 2,525,177 | Lockwood | Oct. 10, 1950 |